United States Patent [19]

Giglia et al.

[11] 4,174,152

[45] Nov. 13, 1979

[54] ELECTROCHROMIC DEVICES WITH POLYMERIC ELECTROLYTES

[75] Inventors: Robert D. Giglia, Rye, N.Y.; John A. Sedlak; David W. Lipp, both of Stamford, Conn.

[73] Assignee: American Cyanamid Company, Stamford, Conn.

[21] Appl. No.: 877,139

[22] Filed: Feb. 13, 1978

[51] Int. Cl.$^2$ .............................. G02F 1/17; G02F 1/23
[52] U.S. Cl. .................................. 350/357; 252/500; 252/408
[58] Field of Search ................. 350/357; 252/500, 408

[56] References Cited

U.S. PATENT DOCUMENTS

| | | | |
|---|---|---|---|
| 3,282,160 | 11/1966 | Jones et al. | 252/408 |
| 3,419,431 | 12/1968 | Michaels | 252/500 |
| 3,453,038 | 7/1969 | Kissa et al. | 350/357 |
| 3,521,941 | 7/1970 | Deb et al. | 350/357 |
| 3,689,810 | 9/1972 | Walles | 252/500 |
| 3,708,220 | 1/1973 | Meyers et al. | 350/357 |
| 3,813,354 | 5/1974 | Chiolle et al. | 260/2.2 R |
| 3,840,288 | 10/1974 | Schnatterly | 350/357 |
| 3,931,092 | 1/1976 | Ramlow et al. | 526/303 |
| 3,971,624 | 7/1976 | Bruesch et al. | 350/357 |
| 4,010,117 | 3/1977 | Maruhashi et al. | 252/500 |
| 4,071,508 | 1/1978 | Streckler | 526/240 |

FOREIGN PATENT DOCUMENTS 2603200  8/1976  Fed. Rep. of Germany ........... 350/357

*Primary Examiner*—Brooks H. Hunt
*Assistant Examiner*—T. S. Gron
*Attorney, Agent, or Firm*—Bruce F. Jacobs; Gordon L. Hart

[57] ABSTRACT

Improved electrochromic devices result from the incorporation of novel polymeric electrolytes. The electrolytes are based upon copolymers prepared from vinyl monomers and acid-group-containing monomers.

7 Claims, No Drawings

ELECTROCHROMIC DEVICES WITH POLYMERIC ELECTROLYTES

This invention relates to improvements in electrooptical devices which contain a layer of persistent electrochromic material on one electrode in electrical contact with a specific polymeric electrolyte which in addition electrically contacts a counter-electrode in the device. These devices are operated by a flow of electric current between the electrodes through said electrolyte. They are provided with means for applying an electric field to said electrodes and with means for reversing the polarity of the respective electrodes to reverse the electric field and thereby change the photoabsorptive characteristics of the electrochromic layer.

A variety of such devices having numerous uses has been described in the prior art. U.S. Pat. No. 3,708,220, for example, describes electrochromic devices in which a particular gelled electrolyte solution is used.

U.S. Pat. No. 3,521,941, discloses the potential use of plastics, e.g. polyesters, vinyl or like polymers, allylic or like polymers, polycarbonates, phenolics, amino resins, polyamides, polyimides, and cellulosic resins for electrochromic devices.

U.S. Pat. No. 3,971,624 discloses the use of a perfluorinated sulfonic acid polymer as an electrolyte for electrochromic devices, though there is no disclosure of how to incorporate such a polymer into a device.

The present invention is directed to the use of specific polymeric electrolytes which result in improved longer lasting electrochromic devices. The electrolytes used are copolymers of a vinyl monomer and an acid-group-containing monomer.

As used herein, a "persistent electrochromic material" is defined as a material responsive to the application of an electric field of a given polarity to change from a first persistent state in which it is essentially non-absorptive of electromagnetic radiation in a given wave length region, to a second persistent state in which it is absorptive of electromagnetic radiation in the given wave length region, and once in said second state, is responsive to the application of an electric field of the opposite polarity to return to its first state. Certain of such materials can also be responsive to a short circuiting condition, in the absence of an electric field, so as to return to the initial state.

By "persistent" is meant the ability of the material to remain, after removal of the electric field, in the absorptive state to which it is changed, as distinguished from a substantially instantaneous reversion to the initial state, as in the case of the Franz-Keldysh effect.

The materials which form the electrochromic materials of the device in general are electrical insulators or semiconductors. Thus are excluded those metals, metal alloys, and other metal-containing compounds which are relatively good electrical conductors.

The persistent electrochromic materials are further characterized as inorganic substances which are solid under the conditions of use, whether as pure elements, mixtures, or chemical compounds, containing at least one element of variable oxidation state, that is, at least one element of the Periodic System which can exist in more than one oxidation state in addition to zero. The term "oxidation state" as employed herein is defined in "Inorganic Chemistry", T. Moeller, John Wiley & Sons, Inc., New York, 1952.

These include materials containing a transition metal element (including Lanthanide and Actinide series elements), and materials containing non-alkali metal elements such as copper. Preferred materials of this class are films of transition metal compounds in which the transition metal may exist in any oxidation state from +2 to +8. Examples of these are: transition metal oxides, transition metal oxysulfides, transition metal halides, selenides, tellurides, chromates, molybdates, tungstates, vanadates, niobates, tantalates, titanates, stannates, and the like. Particularly preferred are films of metal stannates, oxides and sulfides of the metals of Groups (IV)B, (V)B and (VI)B of the Periodic System, and Lanthanide series metal oxides and sulfides. Examples of such are copper stannate, tungsten oxide, cerium oxide, cobalt tungstate, metal molybdates, metal titanates, metal niobates, and the like.

Additional examples of such compounds are disclosed in U.S. Pat. No. 3,521,941, incorporated herein by reference.

While the exact mechanism of persistent electrochromism is unknown, the coloration is observed to occur at the negatively charged electrochromic layer. Generally, the phenomenon of persistent electrochromism is believed to involve transport of cations, such as hydrogen or lithium ions, to the negative electrode where color centers form in the electrochromic image layer as a result of charge compensating electron flow.

When the persistent electrochromic materials are employed as films, thickness desirably will be in the range of from about 0.1-100 microns. However, since a small potential will provide an enormous field strength across very thin films, the latter, i.e., 0.1-10 microns, are preferred over thicker ones. Optimum thickness will also be determined by the nature of the particular compound being laid down as a film and by the film-forming method, since the particular compound and film-forming method may place physical (e.g., non-uniform film surface) and economic limitations on manufacture of the devices.

When tungsten oxide is employed as the electrochromic imaging material and an electric field is applied between the electrodes, a blue coloration of the previously colorless electrochromic layer occurs, i.e., the persistent electrochromic layer becomes absorptive of electromagnetic radiation over a band initially encompassing the red end of the visible spectrum, thereby rendering the imaging layer blue in appearance. Prior to the application of the electric field, the electrochromic imaging layer is essentially non-absorbent and thus colorless.

The electrodes used herein may be any material which, relative to the electrochromic film, is electrically conducting. These electrically conductive materials are generally coated on a suitable substrate material such as glass, wood, paper, plastics, plaster and the like, including transparent, translucent, opaque or other optical quality materials. At least one of the electrode-substrate combinations is transparent, though both may be.

The copolymers suitable for use in the present invention are essentially hydrophilic vinyl resins which have been made ion conductive by incorporation of compatible monomers which contain acid groups. The resultant copolymers are characterized by being hydrophilic, essentially clear, mechanically tough and stable, proton conducting, and electron insulating. Optionally, the copolymers may be crosslinked and/or contain a humectant to improve the hydrophilic characteristics of the copolymer. Preferably, the copolymers are water insoluble or are made so by crosslinking.

Preferably the vinyl monomer employed is a hydroxy lower alkyl ($C_{1-4}$) acrylate or methacrylate, or hydroxy lower alkoxy ($C_{1-4}$) acrylate or methacrylate e.g. 2-hydroxyethyl acrylate, 2-hydroxyethyl methacrylate, ethylene glycol monoacrylate, diethylene glycol monomethacrylate, 2-hydroxypropyl acrylate, 2-hydroxy-propyl methacrylate, 3-hydroxypropyl acrylate, 3-hydroxy-propyl methacrylate, dipropylene glycol monomethacrylate, dipropylene glycol monoacrylate, and 2,3-dihydroxypropyl methacrylate. The most preferred monomers are the hydroxyalkyl acrylates amd methacrylates, particularly 2-hydroxyethyl methacrylate.

There may also be employed as monomers: acrylamide, methacrylamide, N-alkyl ($C_{1-6}$) substituted acrylamides and methacrylamides, such as N-propylacrylamide, N-isopropylacrylamide, N-isopropylmethacrylamide, N-propylmethacrylamide, N-butylacrylamide, N-methylacrylamide and N-methylmethacrylamide, diacetone acrylamide, N-(2-hydroxyethyl)acrylamide, N-(2-hydroxyethyl)methacrylamide, N-vinyl-2-pyrolidone, and N-(isobutoxymethyl)acrylamide.

Other suitable copolymerizable monomers include methyl acrylate, ethyl acrylate, isopropyl acrylate, propyl acrylate, butyl acrylate, sec.-butyl acrylate, pentyl acrylate, 2-ethylhexyl acrylate, methyl methacrylate, ethyl methacrylate, propyl methacrylate, isopropyl methacrylate, butyl methacrylate, sec.-butyl methacrylate, pentyl methacrylate, aryl acrylates, e.g., benzyl or phenyl acrylate or methacrylate, lower alkoxyethyl acrylates and methacrylates, e.g. methoxyethyl acrylate, methoxyethyl methacrylate, ethoxyethyl acrylate, ethoxyethyl methacrylate, triethylene glycol monoacrylate, triethylene glycol monoethacrylate, glycerol monoacrylate and glycerol monomethacrylate.

There may also be used unsaturated amines, p-aminostyrene, o-aminostyrene, 2-amino-4-vinyltoluene, alkylaminoalkyl acrylates and methacrylates, e.g. diethylaminoethyl acrylate, diethylaminoethyl methacrylate, dimethylaminoethyl acrylate, dimethylaminoethyl methacrylate, N,N-dimethylaminopropyl methacrylamide, methacrylamidopropyl trimethylammonium halide, t-butylaminoethyl acrylate, t-butylaminoethyl methacrylate, piperidinoethyl acrylate, piperidinoethyl methacrylate, morpholinoethyl acrylate, morpholinoethyl methacrylate, 2-vinylpyridine, 3-vinylpyridine, 4-vinylpyridine 2-ethyl-5-vinylpyridine, dimethylaminopropyl acrylate, dimethylaminopropyl methacrylate, dipropylaminoethyl acrylate, dipropylaminoethyl methacrylate, di-n-butylaminoethyl acrylate, di-n-butylaminoethyl methacrylate, di-sec.-butylaminoethyl acrylate, di-sec.-butylaminoethylmethacrylate, dimethylaminoethyl vinyl ether, diethylaminoethyl vinyl ether, diethylaminoethyl vinyl sulfide, aminoethyl vinyl ether, aminoethyl vinyl sulfide, monomethylaminoethyl vinyl sulfide, monomethylaminoethyl vinyl ether, N-(gamma-monomethylamino)propyl acrylamide, N-(beta-monomethylamino) ethyl acrylamide, N-(beta-monomethylamino) ethyl methacrylamide, 10-aminodecyl vinyl ether, 8-aminoctyl vinyl ether, 5-aminopentyl vinyl ether, 3-aminopropyl vinyl ether, 4-aminobutyl vinyl ether, 2-aminobutyl vinyl ether, monoethylaminoethyl methacrylate, N-(3,5,5-trimethylhexyl)aminoethyl vinyl ether, N-cyclohexylaminoethyl vinyl ether, 2-(1,1,3,3-tetramethylbutylamino)ethyl methacrylate, N-t-butylaminoethyl vinyl ether, N-methylaminoethyl vinyl ether, N-2-ethylhexylaminoethyl vinyl ether, N-t-butylaminoethyl vinyl ether, N-t-octylaminoethyl vinyl ether, 2-pyrrolidinoethyl acrylate, 2-pyrrolidinoethyl methacrylate, 3-(dimethylaminoethyl)-2-hydroxypropyl acrylate, 3-(dimethylaminoethyl)2-hydroxypropyl methacrylate, 2-aminoethyl acrylate, 2-aminoethyl methacrylate.

The acid-group-containing monomers used herein are those which may be copolymerized with the above vinyl monomers and contain acid functional groups, preferably strong acid groups such as sulfonic or phosphoric. Examples of suitable acid comonomers include 2-acrylamido-2-methylpropane sulfonic acid, 2-sulfoethylmethacrylate, alpha-cyanoacrylic acid, acrylic acid, methacrylic acid, alpha-fluoroacrylic acid, itaconic acid, fumaric acid, maleic acid, alpha-bromoacrylic acid, cinnamic acid, alpha-nitroacrylic acid, vinylacetic acid, alpha-chlorovinylacetic acid, alpha-fluorovinylacetic acid, alpha-bromovinylacetic acid, 2-vinylpropionic acid, aconitic acid, allylacetic acid, 2-allyloxypropionic acid, 2-allylphenoxyacetic acid, crotonic acid, allylarsonic acid, vinylphosphonic acid, allylphosphonic acid, alpha-propenyl phosphonic acid, alpha-styrylphosphonic acid, 2-chloro-3-butenyl-1-phosphonic acid, 2-chloro-1,3-butadienylphosphonic acid, allylphosphinic acid, acrylamidomethylphosphonous acid, 4-vinylsalicylic acid, 2,2-difluoro-3-butenoic acid, and derivatives of each.

The acid-group-containing monomers are used to the extent of at least about 5% by weight of the monomers, preferably at least 10%, most preferably at least 20%, and up to about 80%.

Optionally the copolymers may be at least partially crosslinked to enhance the dimensional stability and insolubility of the resultant polymers. Suitable crosslinking agents include ethylene glycol diacrylate, ethylene glycol dimethacrylate, 1,2-butylene dimethacrylate, 1,3-butylene dimethacrylate, 1,4-butylene dimethacrylate, propylene glycol diacrylate, propylene glycol dimethacrylate, diethylene glycol dimethacrylate, dipropylene glycol dimethacrylate, diethylene glycol diacrylate, dipropylene glycol diacrylate, divinyl benzene, divinyl toluene, diallyl tartrate, allyl maleate, divinyl tartrate, triallyl melamine, N,N'-methylenebis-acrylamide, glycerine trimethacrylate, diallyl maleate, divinyl ether, diallyl monomethylene glycol citrate, ethylene glycol vinyl allyl citrate, allyl vinyl maleate, diallyl itaconate, ethylene glycol diester of itaconic acid, divinyl sulfone, hexahydro-1,3,5-triacryloyltriazine, triallyl phosphite, diallyl ester of benzenephosphonic acid, polyester of maleic anhydride with triethylene glycol, polyallyl glucose, e.g. triallyl glucose, polyallyl sucrose, e.g., pentaallyl sucrose, sucrose diacrylate, glucose dimethacrylate, pentaerythritol tetraacrylate, sorbitol dimethacrylate, diallyl aconitate, divinyl citraconate, diallyl fumarate, allyl methacrylate, and polyethylene glycol diacrylate.

The above crosslinking agents operate by free radical crosslinking during the polymerization or during a heating of the polymer in the presence of free radical catalysts. Crosslinking may also be effected by condensation reactions with compounds such as hexamethylolmelamine, hexamethoxymethylmelamine, dimethylolurea, dimethylol hydantoin, formaldehyde, and glyoxal.

Other crosslinking agents which may be incorporated as comonomers include such as glycidal methacrylate, N-methylolacrylamide, and isobutoxymethylacrylamide.

After the polymer is incorporated into an electrochromic device as a coating, the polymeric coating may be crosslinked by means such as electron beam, ultraviolet radiation, ionizing radiation, or heat treatment.

To improve the ionic conductivity over long periods of time, incorporation of small amounts, i.e. up to about 25%, of a humectant may be desirable. Suitable humectants include such as glycerol, tetraethylene glycol, and other hydroxy-terminated polyalkylene oxides.

The polymers may be prepared as casting syrups, as aqueous dispersions, by aqueous suspension polymerization or as solutions in organic solvents such as ethyl alcohol, methyl alcohol, propyl alcohol, isopropyl alcohol, formamide, dimethyl sulfoxide or other appropriate solvent.

Polymerization may be carried out at about 20° to 150° C., frequently 35° or 40° C. to 90° C., and may also be completed after application as a coating. The polymerization may be carried out employing a free radical initiator in the range of 0.95 to 1 percent of the polymerizable monomers. Typical initiators include azobisisobutyronitrile, ammonium persulfate, t-butyl peroctoate, benzoyl peroxide, isopropyl percarbonate, 2,4-dichlorobenzoyl peroxide, methyl ethyl ketone peroxide, cumene hydroperoxide and dicumyl peroxide. Irradiation, e.g. ultraviolet light or gamma rays, also can be employed to initiate the polymerization.

The polymeric electrolytes may be incorporated into the electrochromic device by dissolving the polymer in a suitable solvent, depositing the polymer on the layer below in the device, and evaporating the solvent to produce a solid film of the polymeric electrolyte. The electrolyte preferably has a thickness of about 10,000 Å to 100,000 Å or more, the optimum level varying with the type of polymer, the number and type of protective layers as described below, as well as the use to which the device is to be put. A more complete description of depositing the polymer is disclosed and claimed in co-pending U.S. Ser. No. 841,630 filed Oct. 13, 1977, of Robert D. Giglia, incorporated herein by reference.

Still further improvement in the electrochromic devices is provided by the incorporation of one or more protective layers which are in intimate contact with the polymeric electrolyte and are believed to provide electronic insulation of conduction or permeability from and between the adjacent electronically conductive layers of the device. Suitable materials for the insulating layers, which may be the same or different though preferably the same, include silicon oxide, calcium fluoride, and magnesium fluoride. Also included are other metal oxides or sulfides prepared by oxidizing or sulfiding a metal surface so that the insulator is formed directly in the device. Examples include the above materials as well as aluminum oxide and other inorganic insulators, such as selenide, arsenide, nitride, chloride, fluoride, bromide, and carbide materials.

The insulator layers must be thick enough to offer the requisite electronic insulation, but not so thick as to impair the ionic permeability and/or conduction. Generally, thicknesses of about 100 to 1500 Angstroms are usable. The preferred thickness varies depending upon the actual insulator used. For silicon oxide, the preferred thickness is about 350–450 Angstroms; for magnesium fluoride, about 200–300 Angstroms. As the thickness increases above the preferred ranges, the speed of switching is reduced if the driving voltage is held constant.

When only one insulator protective layer is used, it should be placed between the polymeric electrolyte and the electrochromic film layer to minimize unwanted reactions between the polymer and the film.

When a gold counterelectrode is used in the present devices which have insultating layers on both sides of the polymeric electrolyte, the incorporation of a very thin "nucleating" layer between the insulator layer and the gold counterelectrode results in a still more improved device. Suitable nucleating layer materials include palladium, platinum, and rhodium. Preferably, palladium is used because of its protonic conduction characteristics.

Further description of the protective and nucleating layers is included and claimed in U.S. Ser. No. 849,387, filed Nov. 8, 1977, in the name of Robert D. Giglia et al., incorporated herein by reference.

The devices of the present invention may be conveniently built by depositing one layer upon the other until the desired structure is created.

The following specific examples are given to illustrate the invention further and to show specific embodiments and modes of practice of the invention and are not intended to be limitative.

EXAMPLE 1

Ten grams of 2-hydroxyethyl methacrylate, 3 grams of 2-acrylamido-2-methylpropanesulfonic acid, one gram of methyl methacrylate, 50 grams of ethanol, 30 grams of methanol, 0.1 gram azobisisobutyronitrile, and 2 grams of water are charged to a flask equipped with an agitator, heating oil bath, nitrogen gas inlet and outlet through a reflux condenser. The flask contents are sparged with nitrogen, brought to 65° C. in 10 minutes, and stirred under nitrogen at 65° C. for 12 hours. The product is diluted with 30 grams of ethanol and 10 grams of water and cooled to 25° C. The copolymer solution is ready to be used in making an electrochromic device.

EXAMPLE 2

Twelve grams of 2-hydroxyethyl methacrylate, 2 grams of 2-acrylamido-2-methylpropanesulfonic acid, 0.05 gram ethylene glycol dimethacrylate, 50 grams ethanol, 30 grams methanol, 0.1 gram of azobisisobutyronitrile, and 4 grams of water are charged to a flask equipped with an agitator, heating oil bath, nitrogen gas, inlet and outlet through a reflux condenser. The flask contents are sparged with nitrogen and are brought to 65° C. in 10 minutes and then stirred under nitrogen at 65° C. for 12 hours. The product is cooled to 25° C. and diluted with 80 grams ethanol and 20 grams water. The copolymer solution is then ready for use.

EXAMPLE 3

Nine grams of 2-hydroxyethyl methacrylate, 1 gram of 2-acrylamido-2-methylpropanesulfonic acid, 50 grams of ethanol, 30 grams of methanol, and 0.07 gram of azobisisobutyronitrile are charged to a flask equipped with an agitattor, heating oil bath, nitrogen gas inlet and outlet through a reflux condenser. The flask contents are sparged with nitrogen, brought to 65° C. in 10 minutes, and stirred under nitrogen at 65° C. for 12 hours. The product is cooled to 25° C. and diluted with 40 grams of ethanol. The copolymer solution is then ready for use in an electrochromic device.

EXAMPLE 4

An electrochromic window 14 cm$^2$ in area was made as follows:

A copolymer of hydroxyethyl methacrylate (HEM) and methacrylic acid (MA) was prepared in the ratio 2 parts HEM to 1 part MA by weight. The copolymer was dissolved in ethanol to obtain a 5% solution. A tungsten oxide layer ~5000 Å thick was deposited upon a transparent, conducting layer of indium oxide on glass. The 5% copolymer solution was deposited upon the tungsten oxide layer by spin coating using a Headway Spinner Model EC101. The copolymer layer was 10 to 30 microns thick when dried. A transparent gold layer approximately 125 Å thick was deposited upon the polymer layer.

The device was tested by applying approximately 2.0 volts DC potential between the indium oxide and gold layers, with the indium oxide layer negative. The device colored in a few seconds, reducing light transmission. The polarity was reversed and the color cleared, increasing light transmission.

EXAMPLE 5

An electrochromic mirror 14 cm$^2$ in area was made as follows:

A terpolymer of 1 part 2-acrylamido-2-methylpropanesulfonic acid (AMPS), 2 parts hydroxyethyl methacrylate (HEM) and 1 part methyl methacrylate (MMA) was prepared and dissolved in ethanol to obtain a 10% solution. A tungsten oxide layer was deposited upon a glass substrate. A reflective layer of palladium was deposited upon the tungsten oxide layer followed by a silicon oxide layer. Next the AMPS-HEM-MMA polymer was deposited as in Example 1 followed by a gold counter-electrode.

The mirror was tested by applying 2 volts DC between the palladium layer and the gold layer. Viewed from the glass side the mirror was seen to lose reflectivity when the palladium layer was made negative and regain reflectivity when the palladium layer was made positive.

EXAMPLE 6

An electrochromic information display was made as follows:

A copolymer of HEM-AMPS was prepared in the ratio 11 to 3 by weight. A solution of 4 parts ethanol and 1 part water was used to dissolve the copolymer. The final concentration was 11%. Next a white titanium oxide pigment was mixed into the polymer solution in the ratio 5 parts pigment to 1 part polymer solids. A seven-segment, 5 mm high, numeric eight was made by vacuum deposition of tungsten oxide through a mask onto a transparent, conductive tin oxide glass substrate. The white polymer paste was painted onto the glass electrode and a paper-carbon electrode was pressed into the paste completing the assembly. Upon drying the paste became solid and electrical terminals could be attached to the tin oxide layer and to the paper-carbon electrode. The resultant display operated for more than 500 cycles.

EXAMPLE 7

The procedure of Example 6 was repeated using the following weight proportions of monomers to yield the corresponding crosslinked copolymer:

hydroxyethyl methacrylate: 100
2-acrylamido-2-methylpropanesulfonic acid: 50
hexamethylolmelamine: 1

The copolymer was incorporated into an electrochromic device which operated for more than 700 cycles.

What is claimed is:

1. An electrochromic device comprising an electrode in contact with a layer of persistent electrochromic material which in turn is in contact with an ion conductive hydrophilic, clear vinyl polymer electrolyte which in turn is in contact with a counterelectrode, and electrical means for selectively applying electrical fields of opposite polarity across said electrodes, wherein the electrolyte comprises a copolymer or partially crosslinked copolymer of 95 to 20% by weight of a vinyl monomer selected from 2-hydroxyethyl methacrylate, 2-hydroxypropyl methacrylate, 2-hydroxyethyl acrylate, and 2-hydroxypropyl acrylate and 5 to 80% by weight of an acid-group-containing monoethylenically unsaturated monomer.

2. The device of claim 1 wherein the acid-group containing monomer is selected from 2-acrylamido-2-methylpropanesulfonic acid, acrylic acid, methacrylic acid, 2-sulfoethylmethacrylate, alpha-chloroacrylic acid, and 4-vinylsalicyclic acid.

3. The device of claim 1 wherein the copolymer is a copolymer of 2-hydroxyethyl methacrylate and 2-acrylamido-2-methylpropanesulfonic acid.

4. The device of claim 1 wherein the copolymer is at least partially crosslinked.

5. The device of claim 1 wherein the copolymer further contains a humectant.

6. The device of claim 5 wherein the humectant is selected from glycerol, tetraethylene glycol and hydroxy terminated polyethylene oxide.

7. The device of claim 1 wherein the electrochromic material is $WO_3$.

* * * * *